United States Patent
Saxena et al.

(12) United States Patent (10) Patent No.: US 7,403,475 B1
Saxena et al. (45) Date of Patent: Jul. 22, 2008

(54) METHOD AND APPARATUS FOR ALLOCATING DATA PACKET PATHWAYS

(75) Inventors: Narothum Saxena, Hoffman Estates, IL (US); Yingchun Xu, Madison, WI (US); Chandra Warrier, Schaumburg, IL (US); Karl Freter, Wheaton, IL (US); Claudio Taglienti, Barrington Hills, IL (US)

(73) Assignee: UTStarcom, Inc., Alameda, CA (US)

( * ) Notice: Subject to any disclaimer, the term of this patent is extended or adjusted under 35 U.S.C. 154(b) by 863 days.

(21) Appl. No.: 10/365,710

(22) Filed: Feb. 11, 2003

Related U.S. Application Data

(60) Provisional application No. 60/355,861, filed on Feb. 11, 2002.

(51) Int. Cl.
 - H04L 1/00 (2006.01)
 - H04L 12/26 (2006.01)
 - H04L 12/28 (2006.01)
 - H04L 12/56 (2006.01)
 - H04J 3/14 (2006.01)
 - G01R 31/08 (2006.01)
 - G06F 11/00 (2006.01)
 - H04Q 7/00 (2006.01)

(52) U.S. Cl. .............. 370/228; 370/254; 370/328; 370/401

(58) Field of Classification Search ......... 370/225–228, 370/254, 328, 401, 465
See application file for complete search history.

(56) References Cited

U.S. PATENT DOCUMENTS

| | | | | |
|---|---|---|---|---|
| 5,309,437 A | * | 5/1994 | Perlman et al. | 370/401 |
| 6,754,622 B1 | * | 6/2004 | Beser et al. | 704/226 |
| 6,865,157 B1 | * | 3/2005 | Scott et al. | 370/242 |
| 6,947,408 B1 | * | 9/2005 | Liberti et al. | 370/345 |
| 2002/0041568 A1 | * | 4/2002 | Bender | 370/238 |
| 2002/0089958 A1 | * | 7/2002 | Feder et al. | 370/338 |
| 2003/0198219 A1 | * | 10/2003 | Coggeshall | 370/389 |

* cited by examiner

*Primary Examiner*—Kevin C Harper

(57) ABSTRACT

An apparatus and method for routing data packet connection pathways. A pathway controller monitors all of the packet data service nodes available for the transmission of data packets to mobile nodes in order to allocate the service nodes appropriately. A main call processing node selects an available packet data service node for use for a mobile node based upon the availability of the service nodes. A mobile node may have its data packet pathway deactivated if the network infrastructure determines the need to free-up resources for other mobile nodes. The data packet pathway may be reactivated upon the event of a new data packet arriving for the mobile node. The methods of deactivation and reactivation may be used to solve data packet pathway serving faults. The data packet connection pathways that may be reactivated may be done in a load balanced fashion.

27 Claims, 6 Drawing Sheets

METHOD AND APPARATUS FOR ALLOCATING DATA PACKET PATHWAYS

RELATED CASE

This application claims priority to U.S. Provisional Patent Application Ser. No. 60/355,861, "METHOD AND APPARATUS FOR ALLOCATING DATA PACKET PATHWAYS" filed on Feb. 11, 2002.

FIELD OF THE INVENTION

The present invention relates to routing connections for mobile nodes to a network, and more particularly, to a method for optimizing availability of service during periods of excessive demand for data connections.

BACKGROUND OF THE INVENTION

Wireless networks are becoming an increasingly popular means for the exchanging of voice and data between mobile nodes (such as cellular telephones, Personal Digital Assistants (PDAs), cellular telephone modems, and other devices). One example of a wireless network used for communication is the cellular wireless network. A user can seek information over the Internet or call anyone connected to the Public Switched Telephone Network (PSTN) from any place inside the coverage area of most wireless networks.

With the increase of the popularity of wireless applications, much of the network infrastructure has become over populated. Next generation networks are specifying call models that have mobile nodes always connected to the Internet. Even with no data traffic, the network may be expected to maintain an active connection for all users. One way to solve this problem may be to expand the infrastructure by installing more physical hardware to interconnect computers and users. Such equipment includes transmission media, satellites and antennas, routers, aggregators, repeaters, and other devices that control transmission paths. Another way to solve this problem may be to use code division multiple access (CDMA). CDMA permits multiple users on the same channel at the same time allowing the network infrastructure to support more wireless users.

CDMA may still be limited by the network infrastructure which needs to connect many users at one time. CDMA may use a mobile Internet Protocol (IP) which provides a mechanism for routing IP packets to mobile nodes that may be connected to any network while using their permanent IP address. Mobile IP can identify a host by a single IP address even while the mobile node physically moves its point of attachment from one network to another as in the case of a mobile user. A host, as described within, specifies a network that the mobile node may use to access other entities such as mobile nodes, other networks, or the Internet.

The mobile node may be able to discover whether it is at home or away from home. A mobile node is home or in a home area when the mobile node is in the cell sector defining the local boundaries of use of the mobile node. Routers acting as home agents (HAs) or foreign agents (FAs) may advertise their existence. HAs may be routers located on the mobile node's home network that are capable of tunneling (tunneling refers to packet re-addressing) the mobile node's packets to it while it is away. FAs may be routers on a foreign network that can de-tunnel these packets from the HA. Mobile IP allows for the delivery of IP packets to mobile nodes. This may allow for more users to be connected at one time, but mobile IP may still be limited by the network infrastructure capabilities.

Network routers may employ methods of routing signals to their destination that may optimize the availability of service during periods of excessive demand. A router may create or maintain a table of the available routes and their conditions and use this information along with distance and cost algorithms to determine the best route for a given packet.

A router may be used in a method for matching IP addresses to destination computers using an Address Resolution Protocol (ARP). ARP is a protocol that may be used for mapping an IP address to a physical machine address, or Media Access Control (MAC address), that may be recognized in the local network. A table, usually called the ARP cache, may be used to maintain a correlation between each MAC address and its corresponding IP address. The ARP cache is a place to store the MAC address and its corresponding IP address more or less temporarily. ARP provides the protocol rules for making this correlation between addresses and providing address conversion in both directions.

When an incoming data packet destined for a host machine on a particular local area network arrives at a router, the router makes an ARP request to find a physical host or MAC address that matches the IP address. ARP searches for a MAC address in the ARP cache and, if the ARP finds the matching MAC address, ARP provides the MAC address so that the data packet can be converted to the right packet length and format and sent to the machine. If no matching MAC address is found for the IP address, ARP broadcasts a request to all the machines on the Local Area Network (LAN) to determine if one machine knows that it has the specified IP address associated with it. A machine that recognizes the IP address as its own returns a reply so indicating. ARP updates the ARP cache for future reference and then sends the data packet to the MAC address that replied.

An ARP may be used in a routing system to optimally direct data packets to receiving nodes. Routing systems may be useful for allocating the hardware and software of the network infrastructure. CDMA third generation has the need for a network infrastructure to have the capability of supporting mobile nodes during periods of excessive demand for data connections, therefore, it may be useful to introduce a routing system to load balance mobile nodes to allow for a method of optimizing availability of service during periods of excess demand.

DESCRIPTION OF FIGURES

An exemplary embodiment of the present invention is described herein with reference to the drawings, in which.

DETAILED DESCRIPTION

According to exemplary embodiments, the present invention allows a network infrastructure to remove and restore (i.e., deactivate and activate) data path connections to mobile nodes without signaling or otherwise sending notice to either the mobile node or the end network node that the active data path connection had been removed. The removal of the data path connection would not hinder the transmission of the data packets to the mobile node. The removal of the data path connection would be temporary and need not affect a wireless connection of the mobile node to the network. The data path connection may later be restored to transmit data packets to the mobile node.

Figure 1:
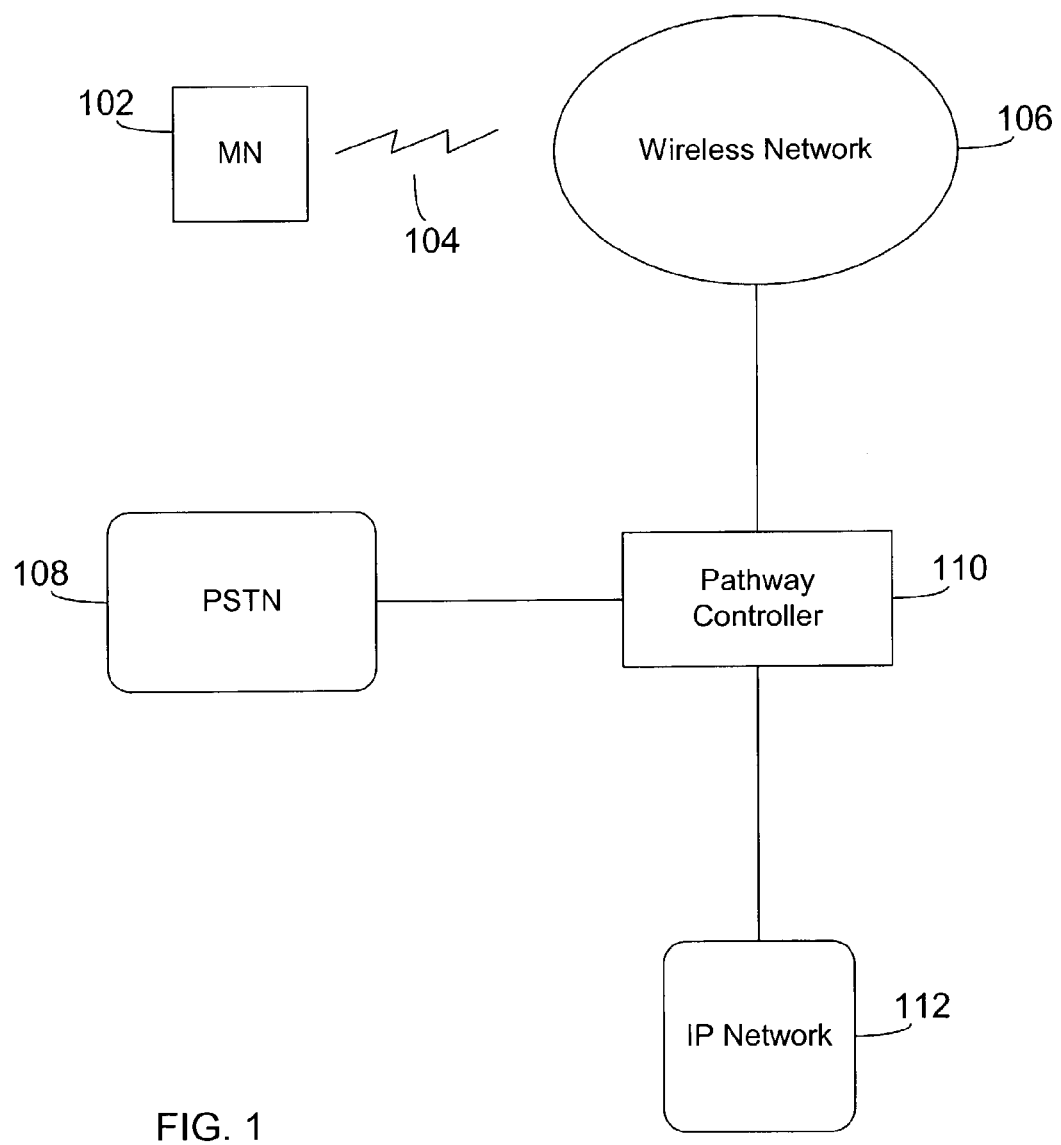
FIG. 1 is an illustration of components to link mobile nodes to a packet-switched network arranged to operate in accordance with an exemplary embodiment of the present invention.

FIG. 1 depicts operation of, a plurality of mobile nodes linked to a packet-switched network arranged to operate in accordance with an exemplary embodiment of the present invention. A mobile node 102 may connect to the wireless network 106 through an air interface using a wireless connection 104. A mobile node 102 may be any one of a cellular telephone, a Personal Digital Assistant (PDA), a cellular telephone modem, or another wireless communications device. The wireless network 106 may be connected to a pathway controller 110 using high-speed digital Frame Relay (FR) lines or using an Ethernet transmission line.

In one embodiment, the pathway controller 110 may monitor the data packet traffic on the Ethernet transmission lines to provide optimal usage of the transmission lines. The pathway controller 110 may also monitor the activity of mobile nodes by monitoring the time between data packet transmissions to the mobile nodes through the Ethernet transmission lines. The pathway controller 110 may also act as a means for linking or coupling components in the packet-switched network. The wireless network 106 may be connected to the Public Switched Telephone Network (PSTN) 108 and to the IP network 112 through the pathway controller 110.

In an exemplary embodiment, the mobile node 102 transmits data to a Mobile Switching Center (MSC) within the wireless network 106. The MSC is preferably a component in a wireless network serving system typically used by wireless service providers to deliver wireless telephony services, for example, in a cellular mobile phone system. The MSC may, in conjunction with other components such as a signal transfer point (STP) and other well-known serving system components, provide the mobile node 102 with the ability to connect to the PSTN 108.

The MSC may also provide certain multiplexing and switching functions for the mobile users. Multiplexed digital data from a plurality of remote wireless users may then be transmitted via high-speed communication formats, such as Frame Relay. Frame Relay is one known method of transmitting data in packets or "frames" in order to send data in clusters at one time. An example of a typical frame length may be 4 kilobytes. Each frame may start and end with a flag character (such as 7E Hex). The first two bytes of each frame following the flag may contain information required for multiplexing across the networks. The last two bytes of the frame may be generated by a Cyclic Redundancy Check (CRC) of the rest of the bytes between the flags. The CRC may be used for error correction and detection. The rest of the frame may contain the user data.

In a typical wireless network serving system, a base station and/or a central base station controller operated by the wireless network 106 operates in conjunction with the MSC to transmit data to the mobile node 102. The base station may be an outlying antenna with the capability of transmitting and receiving signals from the mobile node 102. Embodiments of the present invention may comprise any suitable, wireless network 106 that is well known in the prior art. The particular manner by which the wireless network 106 operates may not be a part of the present invention and may be in any known manner, and may for example, be in accordance with known cellular telephone techniques (digital or otherwise).

Figure 2:
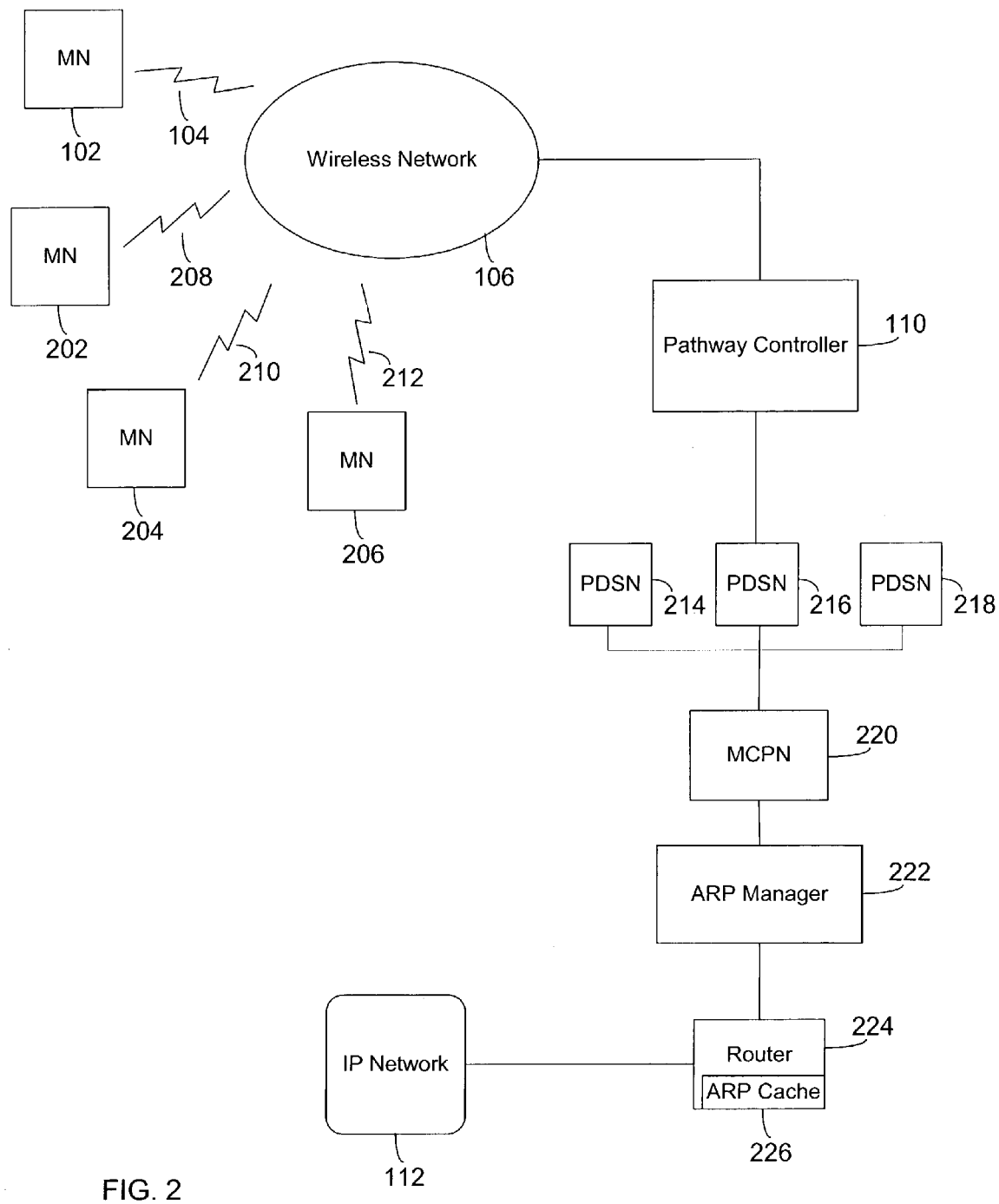
FIG. 2 is a detailed illustration of the system of FIG. 1 arranged to operate in accordance with an exemplary embodiment of the present invention.

FIG. 2 depicts operation of the system of FIG. 1 arranged to operate in accordance with an exemplary embodiment of the present invention. A plurality of mobile nodes 102, 202, 204, 206 may be connected to the wireless network 106 through wireless connections using the air interface. The wireless network 106 may be connected to a pathway controller 110 through Ethernet transmission lines, or through any other suitable data network connection. The pathway controller 110 is connected to the IP network 112 through a series of connection components. The pathway controller 110 is first connected to a plurality of Packet Data Service Nodes (PDSN) 214, 216, 218, which may serve as a data packet pathway for mobile nodes. The plurality of PDSNs 214, 216, 218 are then connected to a Main Call Processing Node (MCPN) 220 which, in turn, connect to an ARP Manager 222. The ARP Manager 222 communicates to a router 224 which may have an ARP cache 226 (as for example, an area of memory) for temporarily storing mobile node IP address and MAC address correlations. In another embodiment, the ARP cache 226 may be separate and apart from the router 224, which may be located anywhere on the IP network 112.

As shown in FIG. 2, the plurality of PDSNs 214, 216, 218 ultimately provides the radio network or wireless network 106 a connection to the IP network 112 via the serving router 224. The PDSNs 214, 216, 218 establish, maintain, and terminate link layer sessions to a mobile node. Incremental functions may include, but are not limited to: IP address assignments for simple IP service, and performing foreign agent functionality for a visiting mobile node for mobile IP service. Simple IP based service mainly supports mobile node initiated dial-in. A PDSN may comprise an interface between an access network and a data network. The PDSNs 214, 216, 218 may terminate the data link layer from the mobile nodes 102, 202, 204, 206 and may route upper layer protocols into a data network directly. For mobile IP based service, the PDSNs 214, 216, 218 support the standard mobile IP foreign agent functionality with extensions to possibly support functions such as reverse tunneling, foreign agent challenge or response authentication, Network Access Identifier (NAI) based registration, and dynamic home agent and home address assignment.

A user may use the mobile node 102 to initiate a wireless connection 104 with a wireless network 106 by dialing the wireless service connection telephone number to which the user of the mobile node 102 may be a subscriber. The wireless connection 104 provides an attachment point for the mobile node 102. The attachment point may be a position in the wireless network 106 that may be considered the wireless connection 104 point of the mobile node 102. Upon initiating a wireless connection 104, a gratuitous ARP (e.g., an ARP request for the mobile node's 102 own IP address) may be issued to the router 224, identifying itself as the recipient of IP packets destined for the mobile node 102. This may be a call signaling process, using a router 224 through which the data packets enter the network from another network. The network infrastructure may determine if it needs to free-up space and may remove the entry for the present inactive mobile node. This decision may be made by the pathway controller 110 by monitoring data packet traffic through the Ethernet transmission lines. The router 224 may then be sent a message telling it to no longer use the entry in the ARP cache for the IP address of the mobile node 102.

The pathway controller 110 may determine the need to remove an entry for the mobile node 102 in a number of ways. Referring to FIG. 2, the pathway controller 110 may maintain a real-time account of the second mobile node 202, the third mobile node 204, or the fourth mobile node 206 that may request data packets from the IP network 112. The network infrastructure may only contain the first PDSN 214, the second PDSN 216, and the third PDSN 218 to realize the pathway connections. In this embodiment, four mobile nodes may be requesting data packets, but the network infrastructure may only have the capability to serve three at any one instance. The pathway controller 110 may also monitor the frequency at which data packets may be sent to the mobile nodes. Upon observing a pre-set time of lack of data packet transmission, the pathway controller 110 may deactivate the PDSN 214 prescribed to realize the pathway connection for the mobile node 102, and reallocate the PDSN 214 to a fourth mobile node 206 requesting data packets.

The pathway controller 110 monitors the activity of the mobile nodes by monitoring the time between subsequent data packet transmissions. For example, a time limit may be set between subsequent data packet transmissions. If the mobile node 102 does not request a data packet within the time limit, then the pathway controller 110 may deactivate that mobile node's PDSN 214, and reallocate the PDSN 214 to be assigned to realize a pathway connection for another mobile node 206 that may currently be requesting data packets, but may not currently have a pathway connection allocated for its use. In this embodiment, the wireless connection 104 of the mobile node 102 of which the PDSN 214 may have been disconnected need not be terminated by the wireless network 106. The mobile node 102 wireless connection 104 is maintained while the data packet connection pathway realized by the PDSN 214 may be temporarily disconnected. In an exemplary embodiment, the serving system need not detect that the data packet connection pathway has been disconnected thereby preventing either disconnection of the wireless call, or an end to the wireless call by communication of a call end message. The pathway controller preferably monitors the data packet connection pathways as a resource that it distributes as needed. This may allow the network infrastructure to remove and restore (i.e., deactivate and activate) mobile nodes without either the mobile nodes or the IP network 112 knowing that the network infrastructure has removed the data packet pathway.

In another embodiment, the pathway controller 110 may determine the need to remove an entry for the mobile node 102 by monitoring the time of which the mobile node 102 may have spent using the IP network 112. For example, the pathway controller 110 may set a time limit of which a mobile node 102 may be allowed to connect to the IP network 112. All authorized mobile nodes may be allocated a certain amount of time to access the network. Authorized mobile nodes may be mobile nodes, which are properly registered with a respective service provider. This amount of time may be based on the type of service of a particular service provider that the mobile node may use to connect to the wireless network 106. For instance, a twenty-minute time limit may be set by the pathway controller 110 according to the service provider for mobile nodes to connect to the IP network 112.

Upon expiration of such a time limit, the pathway controller 110 may disconnect a mobile node's 102 data packet pathway realized by a PDSN 214 and reallocate that PDSN 214 to a requesting mobile node 206 that may have been on a "waiting list." The waiting list may be maintained by the pathway controller 110 in a form of a first come, first serve basis. After the pathway controller 110 has allocated all of the PDSN available in the network infrastructure to requesting mobile nodes, the pathway controller 110 may begin a list of future requesting mobile nodes that may have to wait for an open PDSN in order to connect to the IP network 112. The wait time may be no longer than the set twenty-minute time limit, but may be shorter in the manner of a mobile node requesting to disconnect from the IP network 112 before the mobile node's twenty-minute time limit has concluded.

Other methods of determining the need to deactivate a mobile node's 102 data packet pathway connection may be used. Furthermore, combinations of methods and procedures described may be used in accordance with the present invention. It should be understood that the network infrastructure described herein is provided as an example. Other methods to determine the need to deactivate data packet pathways may also be used. Various types of general purpose or specialized methods may be used with or to perform operations in accordance with the teachings described herein.

Figure 3:
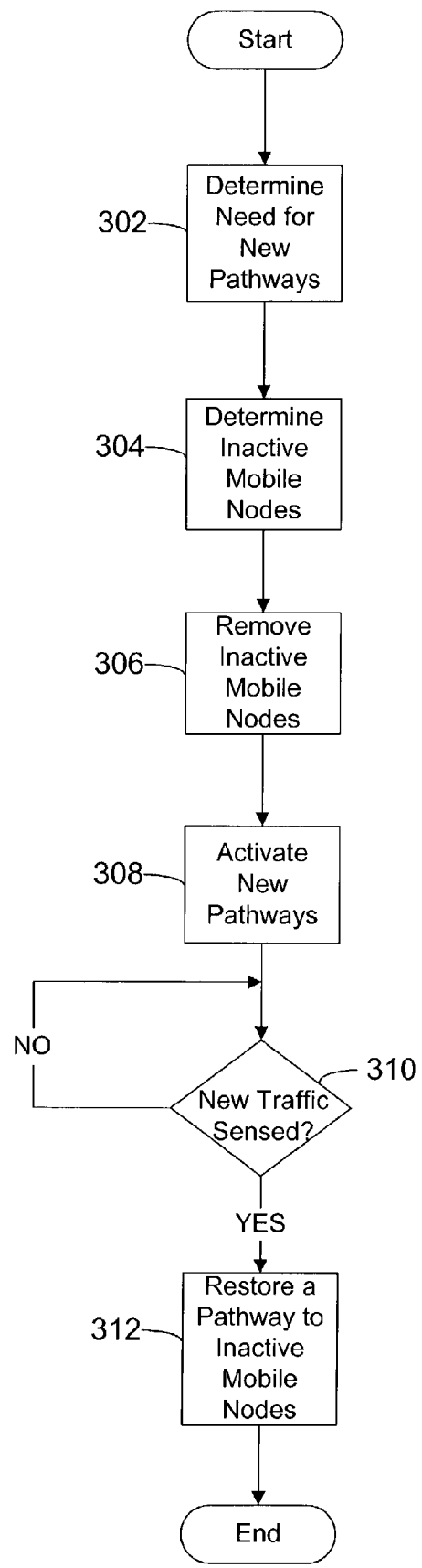
FIG. 3 is a flowchart depicting functional blocks of an exemplary embodiment in accordance with the present invention.

Referring to FIG. 3, a flowchart depicting functional blocks in accordance with an exemplary embodiment of the present invention is shown. In the first step, the network infrastructure may determine the need to suspend or deactivate a mobile node's data packet pathway connection as shown at block 302, in order to free up components of the network for use by other mobile nodes. The pathway controller 110 of the network infrastructure may monitor data packet traffic in order to determine a need to suspend activity for a mobile node. Furthermore, the pathway controller 110 may also determine which mobile node to deactivate and suspend.

Upon observing an inactive mobile node as shown at block 304, the network infrastructure may temporarily deactivate that mobile node as shown at block 306. The network infrastructure may now have the capability to support other mobile nodes and the network infrastructure may now activate a new data packet pathway for another mobile node as shown at block 308. Subsequently, a decision may be made determining if new data packet traffic may be sensed for the mobile node of which the data packet pathway was removed as shown at block 310. Upon observing the awakening or data packet request of that mobile node, the network infrastructure may reactivate the data packet connection pathway to the mobile node as shown at block 312.

Figure 4:
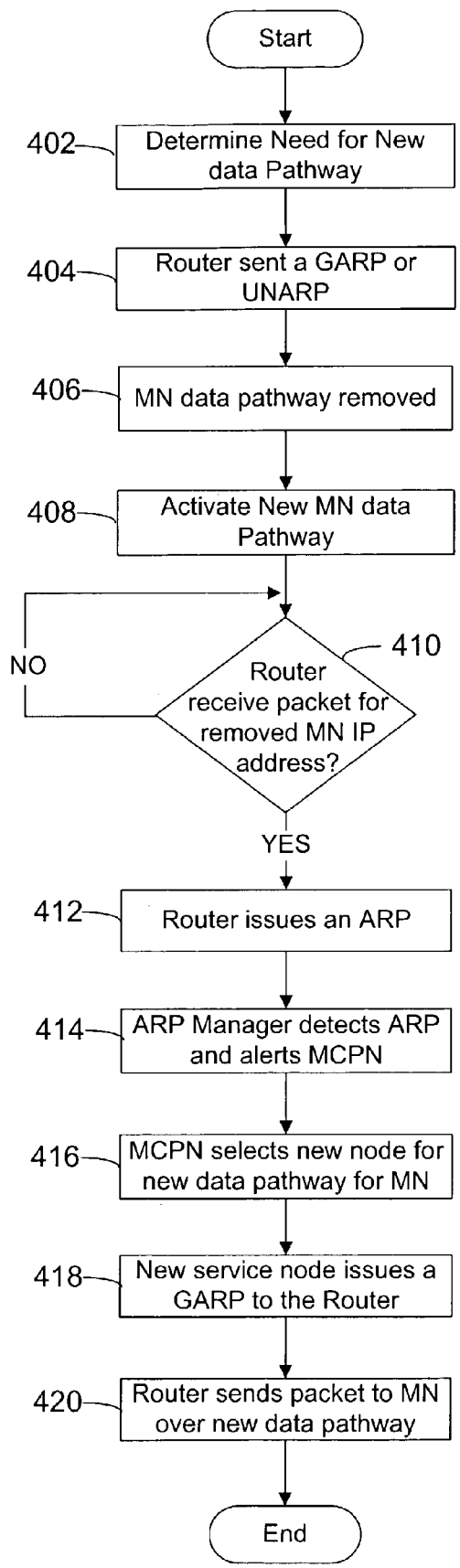
FIG. 4 is a flowchart depicting functional blocks of an exemplary embodiment in accordance with the present invention.

Referring to FIG. 4, a flowchart depicting operation of an exemplary embodiment of the present invention is shown. Initially, the network infrastructure may determine the need to free-up space and may want to remove a data packet connection pathway from an idle mobile node as shown at block 402. The pathway controller 110 may make this determination and the pathway controller 110 may also determine which mobile node to deactivate in order to open a data packet pathway connection for use of another mobile node. In one embodiment, an Unsolicited Address Resolution Protocol (UNARP) message may be used to inform the router to delete the ARP cache entry associated with the IP address of the selected mobile node for deactivation as shown at block 404. Typically, an UNARP message is sent when a remote host disconnects from a network.

In another embodiment, a Group Attribute Registration Protocol (GARP) message may be sent which specifies all "f's" as the destination MAC/IP address (i.e., a false address) to deactivate the mobile node from the data packet connection pathway. A GARP message may provide a generic attribute dissemination capability that may be used by participants in GARP applications to register and de-register attribute values with other GARP participants within a network. In another embodiment, a GARP Multicast Registration Protocol may be used to manage communication between switches and hosts of the network.

After deactivating an idle mobile node's data packet connection pathway as shown at block 406, the network infrastructure may activate a new data packet connection pathway for a new mobile node as shown at block 408. The network infrastructure may then monitor data packet activity. Upon the event of the router in the network infrastructure receiving a new data packet for the removed mobile node IP address as shown at block 410, the router may issue an ARP as shown at block 412. Upon receiving a new data packet for the removed mobile node IP address, the network may need to reinitiate a data packet connection pathway for the mobile node.

In one embodiment, a method of reinitiating a connection pathway may begin with the router issuing an ARP. In one embodiment the router interface may be connected to a network attachment point, and the router may issue an ARP concerning data packet connection pathways that the network infrastructure has previously removed. The issued ARP may inform the network infrastructure that the previously removed data packet pathway has real traffic to process and that the data packet connection pathway may need to be restored promptly. The network infrastructure may have the router use the ARP to recreate the data packet connection pathway. The router used in this application may be that which uses standard router features, therefore, no changes may be required of a normal router for use in this application.

An ARP manager may detect the issuance of the ARP as shown at block 414. The ARP manager may also send an indication to a MCPN alerting the MCPN of the need for an open data packet pathway as shown at block 414. The MCPN may a select PDSN in order to realize the data packet pathway as shown at block 416. The MCPN may also inform the PDSN that it now has the responsibility for the data packet connection pathway of the mobile node, and inform the initial node that there has been a change in the data packet connection pathway, but not the wireless connection. The selected PDSN may issue a GARP message to the router to alert the router of the change, and to specify the new PDSN for the mobile node as shown at block 418. The router may then send the data packet to the mobile node through the PDSN data packet pathway 420.

In a preferred embodiment, an inactive mobile node may hold an active connection after removal of a dedicated data packet connection pathway. This may allow for an optimal usage of the network infrastructure and for an over-subscription of users in the network. The over-subscription of users may be a method to satisfy an excess demand for data packet connections. Since not all users of mobile nodes will be active at the same time, the network will be able to support over-subscription by optimally allocating the data packet pathway connections of the network.

The deactivation and subsequent reactivation of the mobile node 102 may be accomplished as follows:

Initial Mobile Node Setup:

(i) A mobile node 102 connection may be setup through a wireless network 106 and the attachment point may be formed;

(ii) A gratuitous ARP may then be sent and issued to the router 224, identifying the mobile node 102 as the recipient of IP packets destined for the specific MAC address of the mobile node 102;

(iii) The router 224 may setup a data packet connection pathway through the MCPN 220 and a selected PDSN 214;

Deactivation of the Data Packet Connection Pathway:

(iv) The network infrastructure may determine it needs to free-up space and must remove the entry specified for the mobile node 102 data packet connection pathway with the selected PDSN 214; this determination may be made by the pathway controller 110, furthermore, the pathway controller 110 may also determine which mobile node may be deactivated and which mobile node may be activated;

(v) The router 224 may be sent a message telling it to no longer use the cached entry for the mobile node 102 IP address; examples of such a message may be a UNARP message or a GARP message;

(vi) The PDSN 214 currently in use by the mobile node 102 may be disconnected from the mobile node 102 in order to be used for another mobile node 202;

Reactivation of the Data Packet Connection Pathway:

(vii) When the router 224 next gets a data packet for the mobile node 102 IP address, the router 224 may issue an ARP to match the data packet with the specific MAC address of the mobile node 102;

(viii) The ARP manager 222 may detect the issuance of the ARP from the router 224, and the ARP manager 222 may send an indication to the MCPN 220 informing the MCPN 220 that it needs to locate an available PDSN 218 to serve the mobile node 102;

(ix) The MCPN 220 may select an available PDSN 218, and the MCPN may inform that PDSN 218 that it now has the responsibility for the data packet pathway connection of the mobile node 102;

(x) The selected PDSN 218 may issue a GARP to the router 224 identifying itself as the new PDSN 218 for the mobile node 102; and (xi) The router 224 may then send the new data packet from the IP network 112, through the selected PDSN 218 and subsequently through the wireless network 106 to the mobile node 102.

Figure 5:
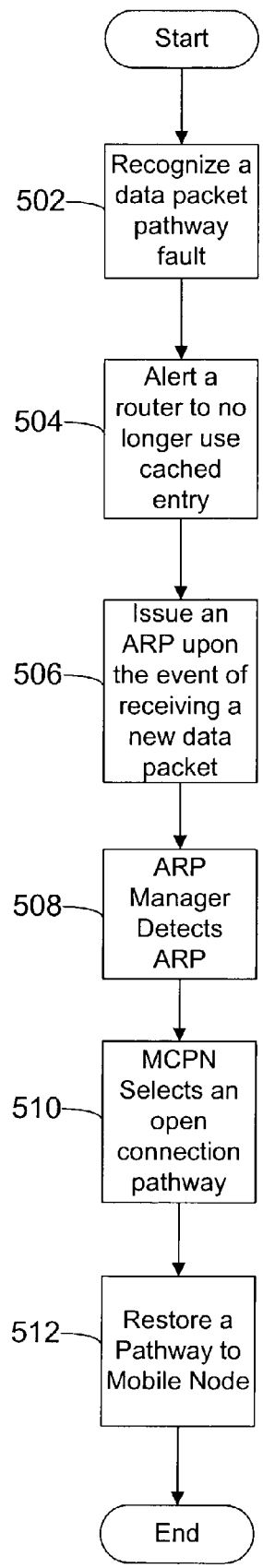
FIG. 5 is a flowchart depicting functional blocks of an exemplary embodiment in accordance with the present invention.
Figure 6:
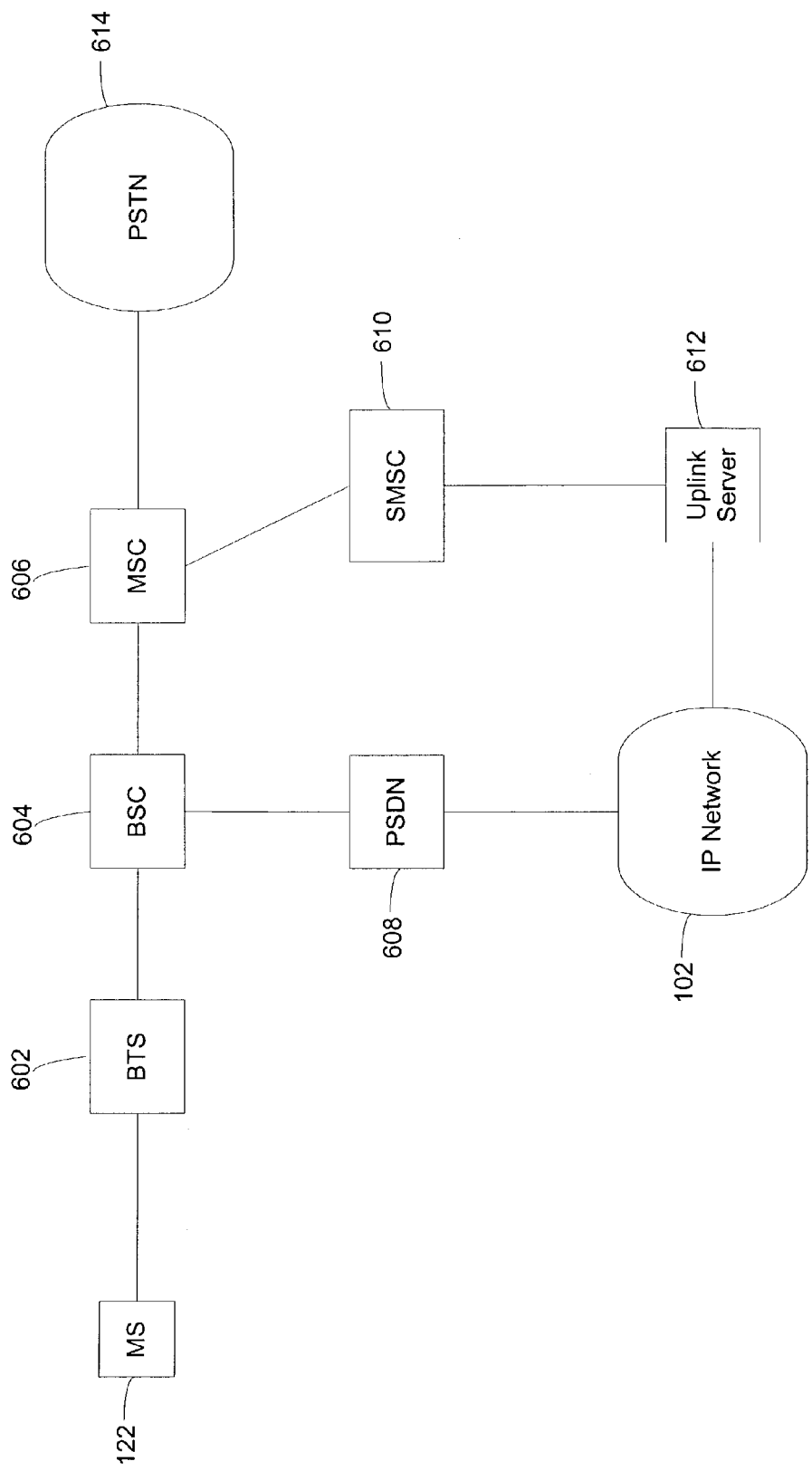

In one embodiment, the method of the present invention allows for the network infrastructure to recover from PDSN faults. Once a PDSN fails, the MCPN, or any other component, may issue the router messages, such as a UNARP or GARP, to deactivate the mobile node from the network. This may allow subsequent data packets from the network to be routed to a new, reliable PDSN. Referring to FIG. 5, a flowchart is shown depicting functional blocks for recovering from a PDSN fault, in accordance with an exemplary embodiment of the present invention. The pathway controller may recognize a data packet pathway fault as shown at block 502. The pathway controller may alert the router to no longer use the cached entry for the mobile node of which the data packet pathway fault occurred as shown at block 504. The router may then return to a set of regular operations, which serve other mobile nodes.

Upon the event that the router receives a new data packet for the mobile node of which the data packet fault occurred on as shown at block 506, the router may issue an ARP as shown at block 506 to re-locate the MAC address in order to determine the address at which to send the data packet. The ARP manager may then detect the issuance of the ARP as shown at block 508. The ARP manager may send an indication to the MCPN indicating the need for a data packet connection pathway. The MCPN may then select an open data packet connection pathway as shown at block 510. The data packet connection pathway may then be restored to the mobile node as shown at block 512, and the data packet may be sent to the mobile node through the selected open data packet connection pathway.

In one embodiment, data packet connection pathways may be restored in a load balanced fashion. The PDSN that a mobile node restores on does not need to be the same PDSN that the mobile node was initially served by. The mobile node may restore a data packet connection pathway through the first available PDSN. Furthermore, PDSN may be selected and allocated for use based reliability of functionality. A PDSN that may be known to work reliably may be selected for use before selecting a PDSN that may have suffered from a PDSN fault. Therefore, the network infrastructure may maintain load balancing on network-initiated data packet connection pathway restores. The network infrastructure may normally be designed to setup data packet connection pathways initiating from the ingress or input port of the components within the network.

An exemplary embodiment of the present invention has been illustrated and described. It will be understood, however, that changes and modifications may be made to the invention without deviating from the scope or extent of the present invention, as defined by the following claims. It should be understood that the processes, methods and systems described herein are not related or limited to any particular type of computer or network system, either hardware or software, unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope or extent of the present invention. For example, the steps of the flow diagrams may be taken in sequences or steps other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

We claim:

1. A method of managing mobile node data packet pathways comprising the steps of:
   deactivating a mobile node data packet pathway connection for a first mobile node;
   maintaining a wireless connection between said first mobile node and a wireless network corresponding to such deactivated mobile node data packet pathway connection;
   receiving a data packet by a router for said first mobile node corresponding to the deactivated mobile node data packet pathway connection and then issuing an ARP by the router; and
   subsequently reactivating the mobile node data packet pathway connection.

2. The method of claim 1, further comprising the step of informing the router of the data packet pathway connection by issuing a GARP message to the router.

3. The method of claim 1, wherein the step of deactivating the mobile node data packet pathway connection is done by issuing a UNARP message to the router.

4. The method of claim 1, wherein the step of deactivating the mobile node data packet pathway connection is done by issuing a GARP message to the router.

5. The method of claim 1, wherein the step of deactivating the mobile node data packet pathway connection results in removing a cached entry for said first mobile node within the router.

6. The method of claim 1, wherein the step of deactivating the mobile node data packet pathway connection is done by a pathway controller.

7. The method of claim 1, further comprising the step of detecting the ARP by an ARP manager.

8. The method of claim 1, further comprising the step of transferring the data packet to the mobile node through the data packet pathway connection.

9. The method of claim 1, wherein the data packet pathway connection is selected from all of available data packet pathways within a network infrastructure.

10. The method of claim 9, wherein the available data packet pathways are those not currently in use.

11. A method of recovering from mobile node data packet pathway serving faults comprising the steps of:
    recognizing a data packet pathway fault to a mobile node, the data packet pathway fault resulting from a failure of transferring data packets to a mobile node;
    alerting a router to no longer use a cached entry for the mobile node;
    issuing an ARP by the router upon the event of the router receiving a new data packet for the mobile node; and
    opening a new data packet pathway upon the ARP issued by the router.

12. The method of claim 11, further comprising the step of detecting the ARP by an ARP manager.

13. The method of claim 11, further comprising the step of transferring the new data packet to the mobile node through the new data packet pathway.

14. The method of claim 11, further comprising the step of informing the router of the new data packet pathway by issuing a GARP message to the router.

15. The method of claim 11, wherein the new data packet pathway is selected from all of available data packet pathways within a network infrastructure.

16. The method of claim 15, wherein the available data packet pathways are those not currently in use.

17. A mobile node routing allocation system comprising in combination:
    a pathway controller, the pathway controller communicably connected to a wireless network, the pathway controller performing the task of deactivating a mobile node data packet pathway connection upon determining the need to open a second data packet pathway while maintaining a wireless connection between the mobile node and a wireless network;
    a router, the router communicably connected to an IP network, the router performing the task of issuing an ARP upon receiving a data packet for the mobile node;

a main call processing node, the main call processing node communicably connected to an ARP manager, the main call processing node performing the task of selecting an open data packet pathway for the mobile node; and a plurality of packet data service nodes, the packet data service nodes communicably connected to the main call processing node, a packet data service node selected from the plurality of packet data service nodes realizing the open data packet pathway for the transferring of the data packet to the mobile node.

18. The system of claim 17, wherein the ARP manager is communicably connected to the router, the ARP manager performing the task of sending a request for the open data packet pathway upon detecting the issuance of the ARP.

19. The system of claim 17, wherein the selected packet data service node informs the router of the open data packet pathway by issuing a GARP message to the router.

20. The system of claim 17, wherein the pathway controller deactivates the mobile node data packet pathway by issuing a UNARP message to the router.

21. The system of claim 17, wherein the pathway controller deactivates the mobile node data packet pathway by issuing a GARP message to the router.

22. The system of claim 17, wherein the deactivating of the mobile node data packet pathway results in removing a cached entry for the mobile node within the router.

23. The method of claim 17, wherein the selected open data packet pathway is selected from an entire pool of pathways.

24. The method of claim 1, wherein the step of deactivating the mobile node data packet pathway connection for said first mobile node deactivates the mobile node data packet pathway by a pathway controller.

25. The method of claim 1, wherein the step of deactivating the mobile node data packet pathway connection for said first mobile node deactivates the mobile node data packet pathway upon determination of inactivity of the mobile node.

26. The method of claim 1, wherein the step of deactivating the mobile node data packet pathway connection for said first mobile node deactivates the mobile node data packet pathway upon determining the need to remove a data packet pathway from said first mobile node.

27. The method of claim 15, wherein the step of opening a new data packet pathway upon the ARP issued by the router opens the new data packet pathway with involvement of an ARP manager.

* * * * *